April 22, 1969  J. H. BLOMSTRAND  3,440,333
CONNECTOR WITH HELICALLY WOUND SPRING AND INTERNAL MEANS
FOR RELEASING THE SPRING TO CAUSE GRIPPING OF WIRES
Filed Feb. 2, 1967  Sheet 2 of 2
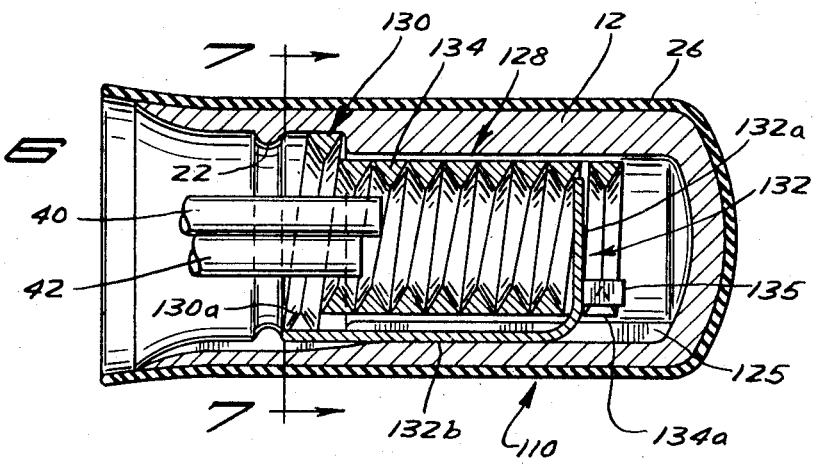
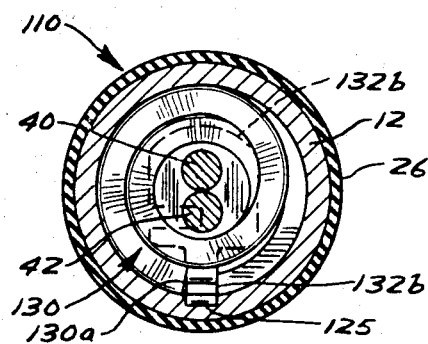
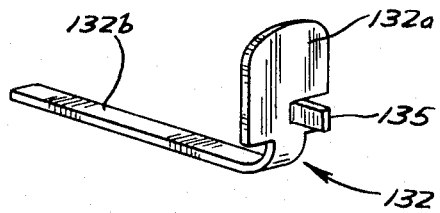
INVENTOR.
JOHN H. BLOMSTRAND
BY
Dugger Peterson Johnson + Westman
ATTORNEYS

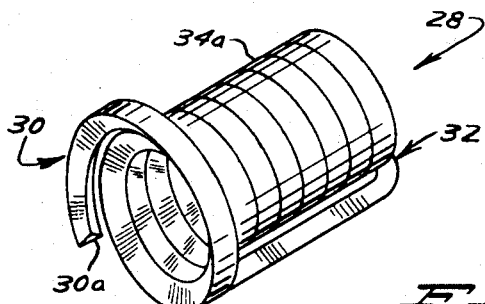
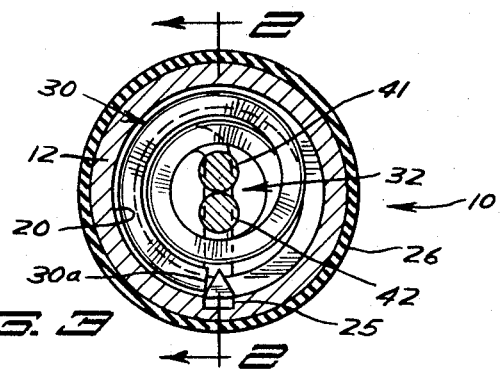
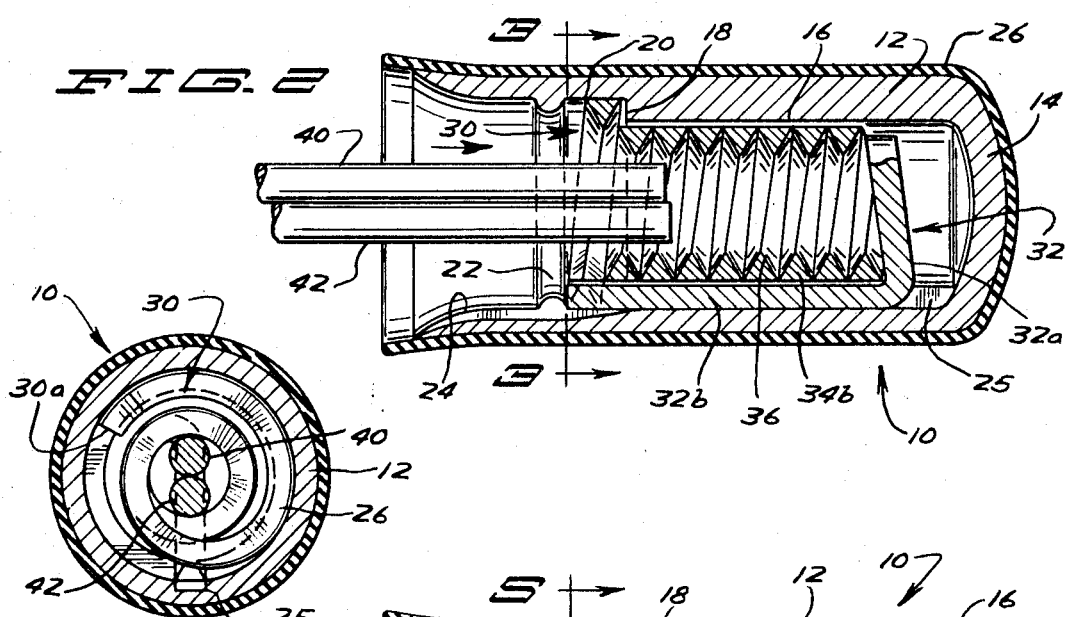
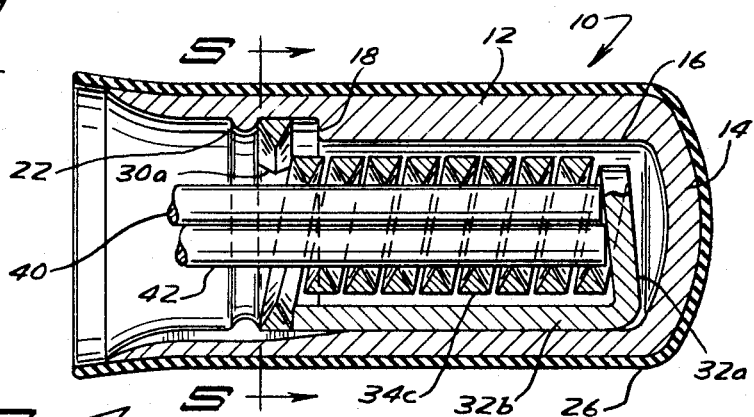

United States Patent Office 3,440,333
Patented Apr. 22, 1969

3,440,333
CONNECTOR WITH HELICALLY WOUND SPRING AND INTERNAL MEANS FOR RELEASING THE SPRING TO CAUSE GRIPPING OF WIRES
John H. Blomstrand, 214 Hazel Drive, Corona Del Mar, Calif. 92625
Filed Feb. 2, 1967, Ser. No. 613,514
Int. Cl. H02g 15/04, 15/08
U.S. Cl. 174—87                 8 Claims

ABSTRACT OF THE DISCLOSURE

An elongated hollow shell contains a coil spring retained in a torsionally cocked condition by a latch arrangement. In one embodiment, the spring itself is configured so as to provide the latching action; in a second embodiment, a supplemental element supplies this feature. In each embodiment, though, when the coil spring is released or unlatched by the insertion of a plurality of wires, the convolutions of the spring that have been enlarged by having been torsionally twisted immediately contract and thereby grip the inserted wires and thus hold them together.

BACKGROUND OF THE INVENTION

Field of the invention

This invention relates generally to devices for securing the ends of a plurality of wires together without resort to soldering, welding or the like, and pertains more particularly to a connector where the gripping action is provided automatically without manual effort on the part of the user.

Description of the prior art

A number of devices, such as the wire connector depicted in my U.S. Patent No. 2,656,204, have been devised, but these prior art devices require a manual twisting of the connector in order to effect the connection of the wires to be joined together. I do not in any way wish to disparage such devices for they have met with widespread commercial success, but the need for manual rotation requires a certain amount of personal effort on the part of the user. Even more important is that the speed with which wires can be connected with such prior art devices is relatively slow compared to my present device because the present connector can be sold or delivered in a cocked condition, thereby accelerating the connecting procedure. Also, this can be done without tools and can be done at a relatively low cost inasmuch as no critical metals need be employed. Furthermore, since the manual twisting required heretofore is obviated, the connector envisaged by the present invention can be quite small and compact.

SUMMARY OF THE INVENTION

The invention, briefly stated, includes a rigid shell which is provided with a dielectric sleeve encasing same when the shell is of metal. The shell is open at one end to allow access to a coil spring contained in the shell. The end of the spring, which will be termed the first spring end, adjacent the open end of the shell is retained in an angularly displaced, helically wound relation with respect to the end of the spring residing nearer the closed end of the shell. To achieve this, the shell is formed with an internal longitudinal groove. In one instance, the end of the spring, that is, the second or opposite spring end, partially blocks the end of the coil spring nearer the closed end of the shell and a continuation of the spring itself is slidably received in the longitudinal groove. The section residing in the groove extends sufficiently forward so that it is in obstructive engagement with the first spring end and remains so until the wires to be gripped effect the release or unlatching. This is done by one of the wires abutting the transverse section of the coil spring to cause the longitudinal section to be slid or retracted enough to disengage it from the first spring end. The convolutions, enlarged by reason of the torsional winding of the spring, then contract to provide an automatic gripping of the inserted wires.

In a modified version of the invention, a separate L-shaped element provides the transverse and longitudinal sections so as to retain the spring in its cocked condition until the panel corresponding to the transverse spring section is engaged by the inserted wires.

BRIEF DESCRIPTION OF THE DRAWINGS

FIGURE 1 is a perspective view of a coil spring utilized in the practicing of the invention;

FIGURE 2 is a longitudinal view taken in the direction of line 2—2 of FIGURE 3 of the embodiment of my invention which employs the spring of FIGURE 1, the view illustrating the connector in a cocked or torsionally wound condition for the reception of a plurality of wire ends which are in the process of being inserted;

FIGURE 3 is a sectional view taken in the direction of line 3—3 of FIGURE 2;

FIGURE 4 is a longitudinal sectional view corresponding to FIGURE 2 but after the coil spring has been released;

FIGURE 5 is a sectional view taken in the direction of line 5—5 of FIGURE 4;

FIGURE 6 is a longitudinal sectional view of a modified connector exemplifying the invention, the connector being in a cocked condition corresponding to the connector of FIGURE 2;

FIGURE 7 is a sectional view along the line 7—7 of FIGURE 6, and

FIGURE 8 is a detail perspective view of an L-shaped element employed in the embodiment of FIGURES 6 and 7.

DESCRIPTION OF THE PREFERRED EMBODIMENTS

The connector embodiment illustrated in FIGURES 2–5 has been denoted in its entirety by the reference numeral 10. A rigid shell 12, suggestively of metal, is formed with a closed end 14, a relatively long smaller diameter bore 16, a shoulder or bearing surface 18, a relatively short larger diameter bore 20, an annular internal rib 22 and a tapered open end or entrance way 24. The interior of the shell 12 has a longitudinal groove 25 formed therein for a purpose that will soon become apparent. Encasing the shell 12 is a sleeve 26 of dielectric material which effectively insulates the connector 10. It is within the purview of the invention to make the shell 12 of dielectric material and in such a situation the shell 12 and sleeve 26 would be of unitary construction, then being completely of plastic, such as nylon.

Contained in the shell 12 is a coil spring generally indicated by the numeral 28. The spring 28 has a first end 30 and a second end 32. A series of resilient convolutions 34 are located between the ends and are of the same transverse size or diameter with the exception of the one forming the spring end 30. Since FIGURE 1 represents the coil spring 28 in its normal or unwound state, the convolutions 34 are smaller in size than they are in FIGURES 4 and 5. More specifically, the coil spring 28 has not been twisted or torsionally wound in FIGURE 1 so the convolutions 34 have not been enlarged; therefore, they have been designated by the reference numeral 34a in this figure.

From FIGURE 2, it can be seen that the convolutions 34 have a triangular cross-section. This configuration enhances the gripping action as a sharp edge or helical tooth 36 is thus provided. As will presently be understood, the convolutions 34 are enlarged in this view, owing to the cocked or charged condition of the coil spring 28, so the convolutions have been given the reference character 34b to distinguish them from FIGURE 1. It can also be discerned in this figure that the second end 32 has a transverse section 32a and a longitudinal section 32b which is slidably disposed in the previously-mentioned groove 26.

At this stage of the description, a comparison should be made between the angular position of the first spring end 30 in FIGURE 1 and its position in FIGURE 3. It will be perceived that the end 30 has been rotated or angularly displaced about ¾ of a turn or 270° in FIGURE 3 from that shown in FIGURE 1. This is possible because the second spring end 32 is held or anchored against rotation by reason of the slot 26 which extends all the way to the closed end 14 of the shell 12. It should be distinctly understood at this point, though, that the groove 26 allows the section 32b to move, but only longitudinally. Therefore, close inspection of FIGURE 3 will reveal that the extremity or tip 30a of the first spring end 30 is latched in the condition there shown due to the obstructive interference or engagement of this extremity with the forwardly disposed extremity of the section 32b. Although it is highly desirable to provide an edge, such as the edge 36, the cross-section of the convolutions need not be truly triangular to provide the edge, as a modified shape may be employed. For instance, the corners at the base of the triangle might be rounded somewhat, which would automatically provide a broader surface against which the tip 30a abuts (FIGURE 3).

It should now be recognized that the purpose of the rib 22 is to hold the coil spring captive. The convolution constituting the end 30 can be circumferentially compressed enough to get past this rib 22 when being assembled in the connector, that is, getting the coil spring 28 into the shell 12 and then being allowed to expand to the degree depicted in FIGURE 2.

With the foregoing information in mind, the manner in which my connector 10 operates should be clear. As pictured in FIGURE 2, a plurality of wires 40, 42 are being inserted. When either or both of the wires 40, 42 reach or abut the transverse section 32a, further insertion to the extent depicted in FIGURE 4 will result in the transverse section 32a being pushed or shifted to the right as shown in FIGURE 4 with the consequence that the longitudinal section 32b is pulled or shifted to release the first spring end 30 from its latched relationship with the longitudinal section 32b. The convolutions labeled 34c in FIGURE 4 then contract because of the immediate unwinding of the spring 28. In other words, the first spring end 30 attempts to return to the relative position it appears in FIGURE 1 and the convolutions 34c likewise try to return to their normal size as shown in FIGURE 1. However, the convolutions 34c cannot do this because of the inserted wires 40, 42. Instead, the convolutions 34c can only contract to the degree illustrated in FIGURE 4 but in the process securely grip the wires with appreciable force as shown in FIGURE 4. It will be appreciated that the spring end 30 rides on the bearing surface or shoulder 18 while doing so.

To avoid having to configure the coil spring as shown in embodiment 10, the modified connector 110 has been depicted in FIGURES 6 and 7. Thus, instead of providing the integral spring sections 32a and 32b, a separate L-shaped element 132 as detailed in FIGURE 8 is employed. The element 132 includes a transverse panel section or tab 132a and a longitudinal strip section or shank 132b which is slidably disposed in the groove 125. The tab 132c is merely placed between the two convolutions 134 farthest to the right in FIGURE 6. In order to anchor that end of the spring 128, a tang 135 is struck from the tab 132a and thereby functions as a stop for the endmost convolution 134a.

Therefore, when the first end 130 is twisted to torsionally wind the coil spring 128, this end can be angularly displaced enough to cock the coil spring so that its subsequent release will cause the convolutions 134 to contract against the inserted wires 40 and 42. It will be understood that the tip or extremity 130a of the first spring end 130 is released by the shank 132b being moved by the tab 132a being acted upon by the wires.

Although the connector 110 is slightly more tedious to assemble, the L-shaped element 132 need not be made of high grade steel. It can be of almost any metal, or even plastic if desired. Consequently, the material of the element 132 can be inexpensive and the fabrication of the spring 128 can be simpler than the spring 28. The operation of the connector 110 is for all intents and purposes identical to that of the connector 10, however.

In summation, it is important to appreciate that there is no manual effort involved when using a connector of the foregoing general type. The spring is pre-loaded so that all that need be done by the user is to trigger its release. This release has been highly simplified by having the inserted wires themselves cause the release with a concomitant automatic gripping of the inserted wires. The amount of gripping action can be determined by various parameters and these parameters are not left to the choice of the user; hence, the requisite amount of gripping or holding action can be more accurately controlled than with the prior art devices hereinbefore alluded to, and the gripping action is derived virtually instantaneously with the arrangement embodied in my connector.

What is claimed is:

1. A connector for gripping and holding a plurality of wires comprising a shell open at one end, a coil spring contained in said shell having first and second longitudinally spaced ends and a series of intermediate resilient convolutions, said first spring end being nearer the open end of said shell than the second spring end, means adjacent said second spring end including a transverse section engageable by at least one end of one of said wires when inserted through the open end of said shell and through said convolutions, and also including a longitudinal section extending into releasable engagement with said first spring end to retain said first spring end in an angularly displaced, helically wound relation with respect to said second spring end to cause transverse enlargement of at least certain of said convolutions to a sufficient degree from their initial size to allow insertion of wires of a cross-section that would not normally be accommodated without enlargement, whereby when said transverse section is moved by a wire end said longitudinal section will be moved in a direction to effect release of said first spring end to allow contraction of said certain convolutions and to provide an automatic gripping of the inserted wires.

2. A connector in accordance with claim 1 in which said shell is formed with a longitudinal groove therein, said longitudinal section being slidably disposed in said groove.

3. A connector in accordance with claim 2 in which said means includes an integral extension of said coil spring, the integral extension providing said transverse and longitudinal sections.

4. A connector in accordance with claim 2 in which said means includes a separate L-shaped element, said L-shaped element providing said transverse and longitudinal sections.

5. A connector in accordance with claim 4 in which the transverse section of said L-shaped element is held between two adjacent convolutions.

6. A connector in accordance with claim 1 in which said shell has an internal shoulder near its open end, the convolution adjacent said first spring end being sufficiently large so as to abut said shoulder.

7. A connector in accordance with claim 6 including an internal rib nearer the open end of said shell than said shoulder and spaced from said shoulder a distance sufficient to retain therebetween said adjacent convolution so that said adjacent convolution is held captive.

8. A connector in accordance with claim 1 in which said shell is of metal and including a dielectric sleeve encasing said shell.

References Cited

UNITED STATES PATENTS

| | | |
|---|---|---|
| 988,911 | 4/1911 | Terry. |
| 1,933,555 | 11/1933 | Jasper _____ 174—87 |

DARRELL L. CLAY, *Primary Examiner.*

U.S. Cl. X.R.

339—256; 287—78, 104; 85—32; 151—14; 29—628